United States Patent
Millard et al.

(10) Patent No.: US 7,312,274 B2
(45) Date of Patent: Dec. 25, 2007

(54) COMPOSITION AND METHOD FOR USE WITH CERAMIC MATRIX COMPOSITE T-SECTIONS

(75) Inventors: Michael Lee Millard, Cincinnati, OH (US); Robert G. Weber, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 10/720,807

(22) Filed: Nov. 24, 2003

(65) Prior Publication Data

US 2005/0112321 A1    May 26, 2005

(51) Int. Cl.
*C08K 5/5419* (2006.01)

(52) U.S. Cl. .................. 524/588; 524/860; 524/858; 524/445; 524/430; 524/768

(58) Field of Classification Search ............... 524/860, 524/858, 588, 445, 430, 786
See application file for complete search history.

(56) References Cited

U.S. PATENT DOCUMENTS

| | | | |
|---|---|---|---|
| 4,357,436 A * | 11/1982 | Zucker et al. ............. 524/448 |
| 5,506,018 A | 4/1996 | Jacob et al. | |
| 5,541,400 A | 7/1996 | Hagiwara et al. | |
| 5,582,784 A | 12/1996 | Daws | |
| 5,658,333 A | 8/1997 | Kelman et al. | |
| 5,658,599 A | 8/1997 | Daws | |
| 5,789,061 A | 8/1998 | Campbell et al. | |
| 5,827,383 A | 10/1998 | Campbell et al. | |
| 5,849,406 A | 12/1998 | Daws | |
| 5,985,368 A | 11/1999 | Sangeeta et al. ......... 427/376.4 |
| 6,120,840 A | 9/2000 | Paul et al. | |
| 6,165,600 A | 12/2000 | Ivkovich et al. ............ 428/213 |
| 6,413,578 B1 * | 7/2002 | Stowell et al. .............. 427/142 |
| 6,648,645 B1 * | 11/2003 | MacDougald et al. ...... 433/223 |
| 6,875,464 B2 * | 4/2005 | Ruud et al. ................. 427/142 |

OTHER PUBLICATIONS

Particle size conversion chart for "mesh" particle size ranges; from www.sigmaaldrich.com.*
Definition of Plasticizer; Kirk-Othmer Encyclopedia of Chemical Technology.*

* cited by examiner

*Primary Examiner*—Margaret G. Moore
(74) *Attorney, Agent, or Firm*—McNees Wallace & Nurick LLC

(57) ABSTRACT

A composition is for use with fabricating a ceramic composite stiffening member that defines a T-section. The stiffening member includes a web portion, at least one flange portion, a radius region disposed between the web portion and the at least one flange portion, and a skin member that is secured to the at least one flange portion and the radius region. The composition is a pliable mixture of refractory particles, plasticizers, silica-yielding polymers, and solvents that is applied along the radius region.

12 Claims, 4 Drawing Sheets

COMPOSITION AND METHOD FOR USE WITH CERAMIC MATRIX COMPOSITE T-SECTIONS

FIELD OF THE INVENTION

The present invention relates generally to a composition and method for use with ceramic matrix composite stiffeners. Specifically, the present invention relates to a composition and method for use with ceramic matrix composite stiffeners having T-sections that provides better consolidation of ceramic material plies during lamination.

BACKGROUND OF THE INVENTION

Composite materials comprising laminated plies of fabric in a resin matrix are often used due to their high strength to weight ratio. Fastening two composite parts together, however, is often troublesome. For example, when one composite part is attached to another composite part, bolts and/or rivets may be used, but such fasteners add weight, increase fabrication cost, and often contribute to local failure modes between the individual plies of the laminate composite.

Composite aircraft stiffeners, typically comprised of carbon matrix material, are used to reinforce thin composite structures such as wing and fuselage skins and bulkhead webs. Other composite constructions, such as ceramic matrix composites (CMCs), provide similar structural support in regions of the aircraft that are subjected to high temperature, such as components associated with engine exhaust, and possibly the engine itself. Due to the frequent mutually perpendicular shape, such stiffeners are often referred to as T-sections. The stiffener attachments must transfer shear loads from the skin to the web portion of the stiffener, as well as out-of-plane loads due to peel (delamination) forces and frame attachments. The web portion of the stiffener extends to a flange portion, which is connected to the skin. Interposed between the web portion and the flange portion is a radius portion, which must transfer structural loads from the stiffener to the skin material. The current practice is to either co-cure, adhesively bond, or mechanically fasten the stiffener to the skin. The co-curing and adhesive bonding techniques offer the minimum weight solution. However, the reliability of co-cured and adhesive bonded joints is generally low. Mechanically fastened joints (e.g. bolts and rivets) have been successfully used, but the use of mechanical joints requires that the laminate be reinforced so that it can react to bolt bearing loads. Additionally, the fasteners themselves are both heavy and expensive and the cost of installation and inspection results in a high cost per fastener.

In addition to bonding techniques, the stiffeners require substantially uniform physical properties to function reliably. The transition between the web portion and the skin of the stiffeners can be problematic, especially for CMCs. Of special concern is a fill-it, which is the region defined by the skin, the radius region(s) and the web portion of the T-section. The fill-it is typically filled with the same matrix material used to separate the composite fibers in the plies. For carbon epoxy composites, this works well, as the matrix material, typically a polymeric composition, is substantially as strong as the fibers. However, the same is not true for CMCs, wherein the matrix material is substantially weaker than the ceramic fibers. Another concern is that the fill-it material for CMCs is exposed to higher fabrication temperatures, such as sintering temperatures wherein ceramic particles are fired to a temperature just below the melting or fusion point to bond the particles together to form a high strength mass. Due to the resulting increase in density of the bonded particles, there is the possibility of separation between the fill-it and the adjacent ceramic plies, creating a structurally weak area.

Instead of the matrix material, CMCs typically use pre-impregnated ("prepreg") ceramic tows or cloth to form the fill-it. A ceramic fiber tow or cloth is infiltrated with a ceramic-yielding slurry, which prepreg tows are cut and individually built up to form the fill-it. Unfortunately, there is no consistent procedure for inserting the ceramic tows, and the number of prepreg tows that are used in the fill-it is based on art and practice. If too few prepreg tows are used, then the radius portion of the stiffener is too sharp, which result in regions of stress concentration. However, if too many tows are used in the fill-it, then a bulge in the radius may occur, resulting in poor structural properties in the radius portions.

Therefore, what is needed is a composition for use in the fill-it that is inexpensive to make, easy to form and apply in a consistent manner, which provides substantially consistent physical properties in CMC stiffeners.

SUMMARY OF THE INVENTION

One embodiment of the present invention is directed to a composition for use with fabricating a ceramic composite stiffener including a web portion, at least one flange portion, a radius region disposed between the web portion and the at least one flange portion, a skin member that is secured to the at least one flange portion and the radius region. The composition is applied along the radius region adjacent the skin member and includes refractory particles, plasticizers, and silica-yielding polymers. A pliable composition is formed by mixing the refractory particles, the plasticizers, the silica-yielding liquids and solvent. The evaporable solvent comprises the balance of the mixture and is added to achieve the desired consistency. Since the plasticizers, silica-yielding liquids and solvent may or may not be comprised of a single constituent material, these terms as used herein may be referred to in either the singular or plural form.

An alternate embodiment of the present invention is directed to a method for fabricating an improved ceramic composite stiffener including a web portion, at least one flange portion, a radius region disposed between the web portion and the at least one flange portion, a skin member that is secured to the at least one flange portion and the radius region. The steps include preparing a pliable composition, which includes refractory particles, plasticizers, and silica-yielding liquids and applying the composition along the radius region adjacent the skin member prior to assembling the skin member. An evaporable solvent is added to achieve the desired consistency for the composition.

One advantage of the composition of the present invention is that it is inexpensive to make.

Another advantage of the composition of the present invention is that it is easy to form and apply in a consistent manner. The evaporable solvent can be added as required to achieve the desired consistency.

A further advantage of the composition is that it provides substantially similar physical properties in CMC stiffeners to the CMCs comprising the skin and flange sections. It can be applied as a filler in the radius region adjacent the skin member and flange without producing a bulge from too large a radius or a region of stress concentration from too sharp of a radius.

A still further advantage of the composition is that, if properly stored, it can be reused. It can thus be premixed and stored until it ready to be applied.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
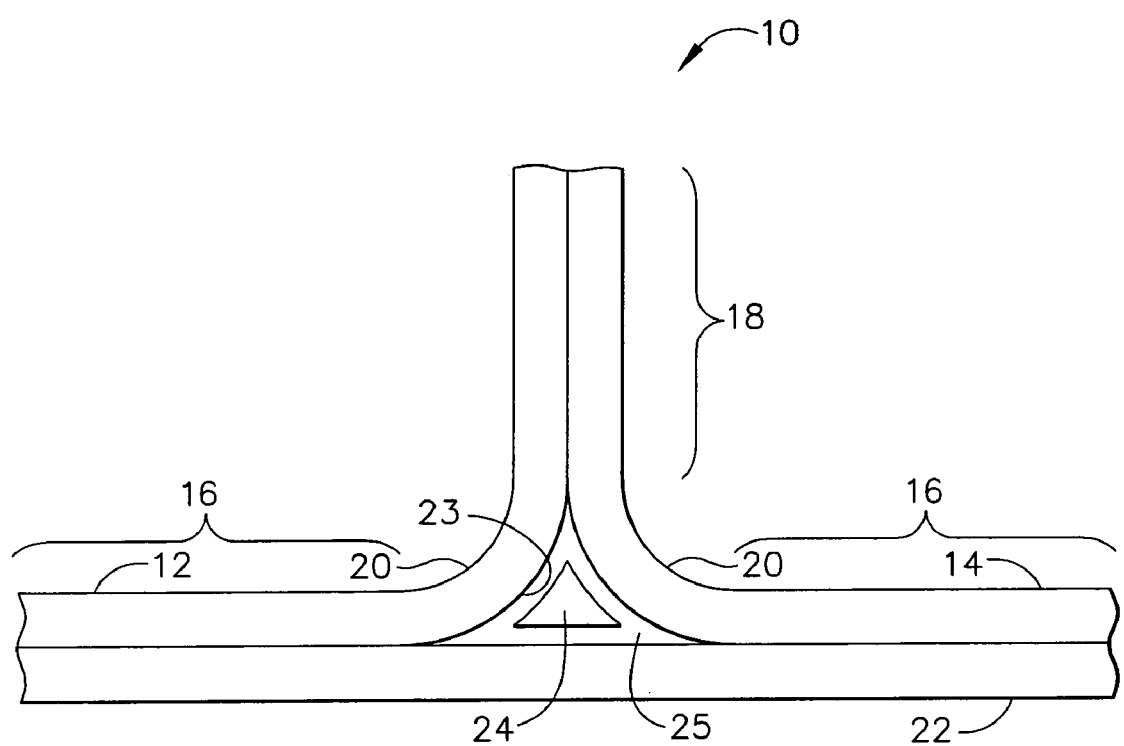
FIG. 1 is a cross section of an improved ceramic matrix composite stiffener of the present invention.

A typical stiffener construction to which the invention can be applied is illustrated, by means of example, in FIG. 1. As shown, a stiffener 10 includes a ply 12 constructed of ceramic fiber and matrix material having a flange portion 16. A second ply 14 similarly constructed of ceramic fiber and matrix material also has an adjacent parallel flange portion 16 lying in substantially the same plane. The flange portions 16 are preferably substantially coplanar to receive a skin member 22, also referred to as a hat. Each of flange portions 16 transition to a corresponding radius portion 20, here an internal radius, which further transitions to a web portion 18, also referred to as a stiffener, that is typically substantially transverse to skin member 22. Web portions 18 of plies 12 and 14 are opposed to each other and are bonded together to provide out-of-plane structural strength from flange portions 16. The transition from web portions 18 to radius regions 20 of plies 12, 14 define a V-groove 23. The enclosed region defined by web portions 18, V-grooves 23 of radius regions 20 and skin member 22 defines a region 25 that is a void, which resembles a triangle with opposed sagging sides. This void is provided with a fill-it 24, which provides structural support by transferring structural loads from stiffener 10 to skin member 22.

Although stiffener 10 is often referred to as a T-section, it is not necessary that web portions 18 and flange portions 16 are perpendicular. It is also possible that stiffener 10 can have a single ply 12 and a skin member 22 such that the fill-it 24 has only one radius region 20. Further, it is possible that stiffener 10 can have more than a single web portion 18. While stiffeners 10 typically have multiple plies or layers, for clarity, flange portions 16 are shown comprising single substantially planar plies 12, 14 and a single hat or skin member 22. It will be understood by those skilled in the art that each stiffener member can include a plurality of plies, the plies added as needed to satisfy load requirements.

Figure 2:
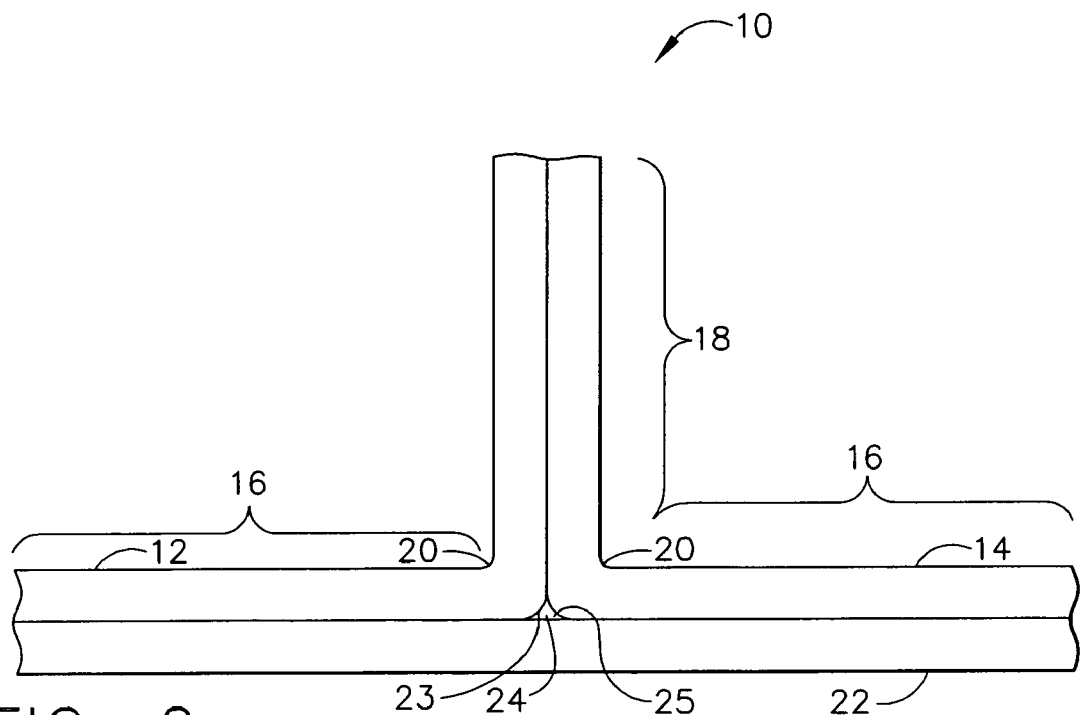
FIG. 2 is a stiffener configuration with an insufficiently sized fill-it.
Figure 3:
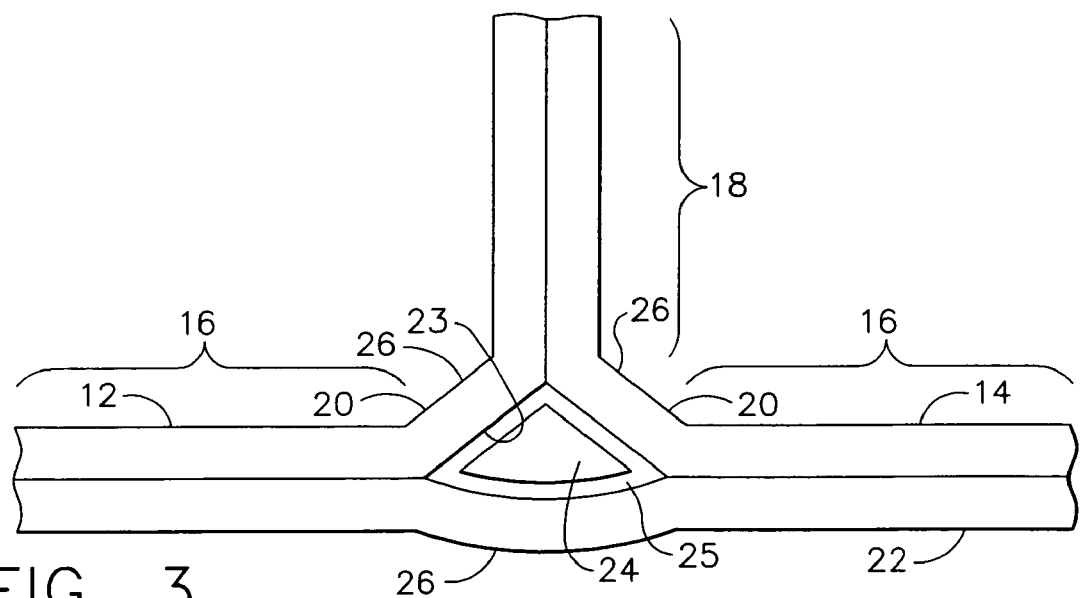
FIG. 3 is a stiffener configuration with an excessively large fill-it.

Referring to FIGS. 1-3, fill-it 24 is added to region 25 and is preferably sized to provide structural support to each radius region 20. Sized properly, fill-it 24 provides a smooth, seamless transition between adjacent flange portions 16 along V-groove 23 to bond skin member 22. Further, the opposed sagging sides of region 25 permit fill-it 24 to provide radius regions 20 to be at least about 0.030 inches. However, providing an insufficient amount of fill-it 24 material (FIG. 2) likewise produces a radius region 20 that is less than 0.030 inches, resulting in an area of raised stress concentration. Conversely, applying too much fill-it 24 material along V-groove 23 (FIG. 3) results in a bulge 26 along each of the radii of the radius region 20, and an additional bulge 26 along the skin member 22. Each bulge 26 is a discontinuity from the otherwise smooth flow of stiffener material, which interferes with the ability of the stiffener to transfer structural loads from one axis to another. That is, from the direction of plies in the web portion 18, which defines a first axis, to the direction of plies in the flange portion 16, that defines a second axis. The known art fill-it 24 material is comprised of prepreg ceramic tows that are cut and individually placed along the V-groove 23 and suffers from the infirmity of insufficient or excessive application of prepreg ceramic tows are often applied along the V-groove 23 of the stiffener 10 (FIGS. 2-3). Even when applied properly, it is time consuming and expensive to arrange the prepreg tows and properly place and align them. Such application can significantly compromise the strength and service life of the stiffener 10.

Figure 4:
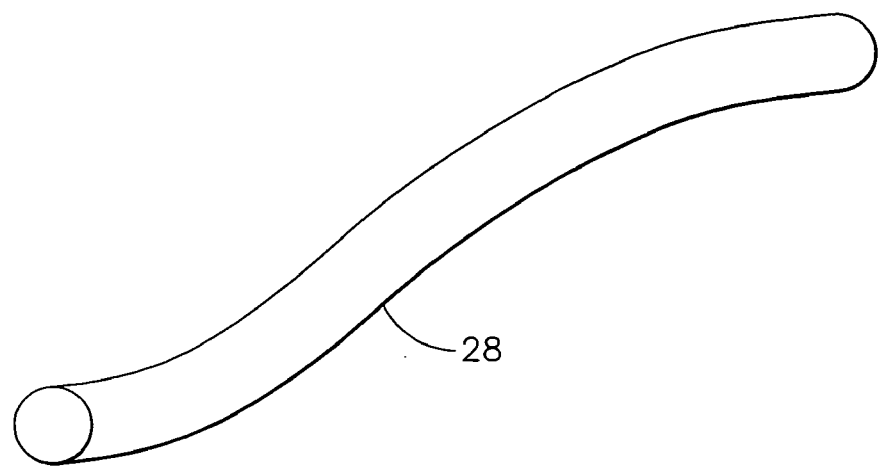
FIG. 4 is an embodiment having a cylindrically shaped profile of a pliable composition configured for use as a stiffener fill-it of the present invention.
Figure 5:
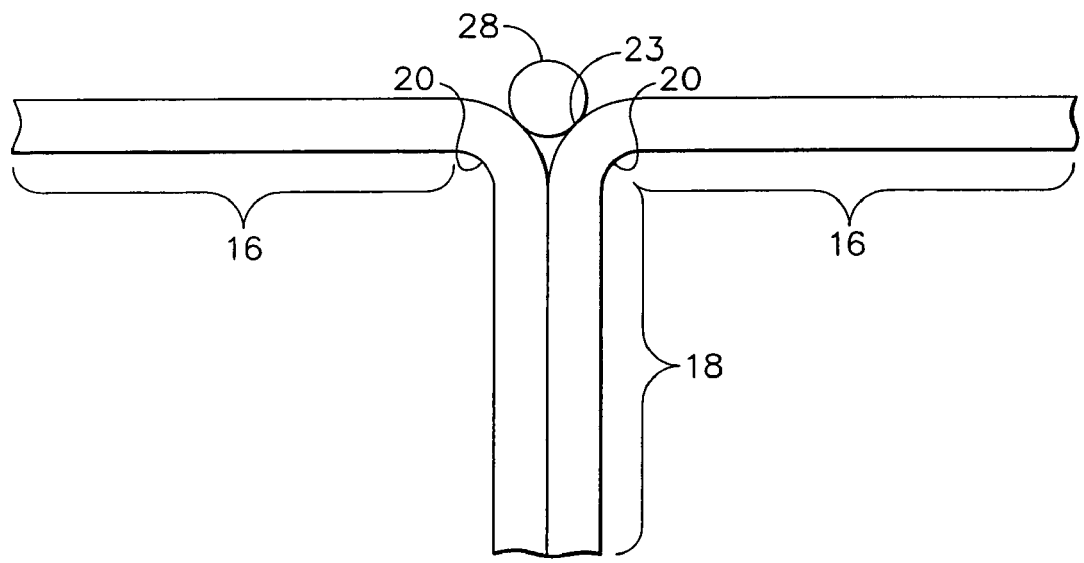
FIG. 5 is a cross section of a stiffener in partial assembly with the cylindrically shaped profile of FIG. 4 installed in the present invention.
Figure 6:
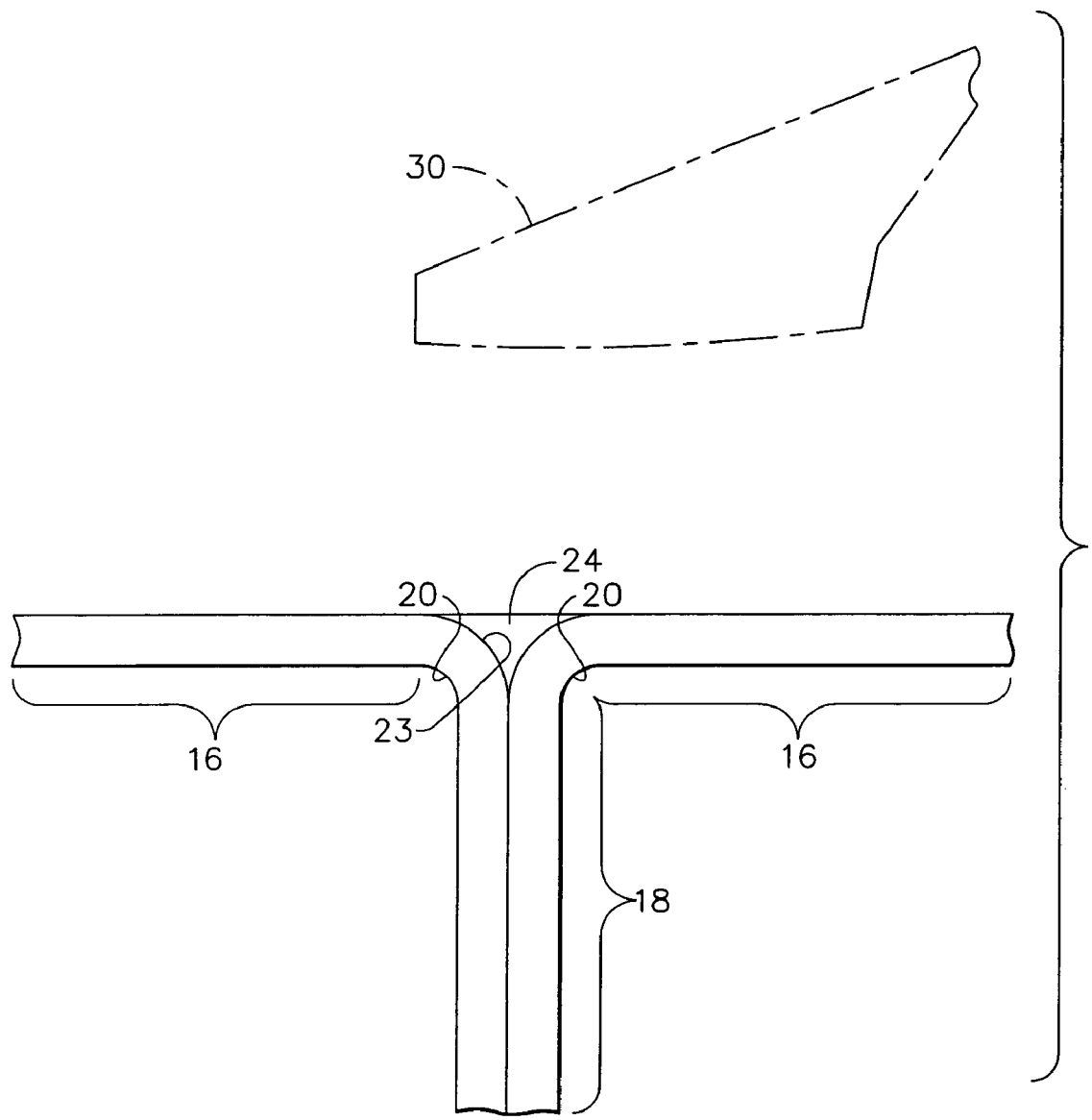
FIG. 6 is the cross section of the partially assembled stiffener of FIG. 5 after the cylindrically shaped profile of FIG. 4 has been shaped into a fill-it of the present invention.

A composition of the present invention is provided for application along the radius portion adjacent the skin member into region 25 and form the fill-it 24. Stated another way, where there are opposed flange portions 16 transitioning to opposed radius regions 20, which opposed radius regions 20 define the V-groove 23, the composition may be applied along the V-groove 23 into region 25 to form the fill-it 24. Referring to FIGS. 4-6, the composition comprises a mixture of ceramic particles, plasticizers, silica-yielding liquid and solvents to form a ceramic-yielding putty that may be automatically or manually mixed. In a preferred embodiment, the putty is formed into a substantially pliable cylindrical shape 28 that is about one eighth of an inch in diameter.

The ceramic particles may include alumina, crushed CMCs, calcined clays and grog (crushed refractory brick or glass) or a combination thereof. The ceramic particles are provided as filler to reduce shrinkage of the fill-it during sintering of the stiffener as well as add strength to the fill-it by promoting adhesion with the silica that is formed from the silica-yielding liquid. The selection of the material used as the ceramic particles is based on matching its thermal expansion with the ceramic plies in the stiffener. Preferably, the ceramic particles consist of both large particles, in the size range from −20 mesh to +50 mesh, and small particles, in the size range of −50 mesh. Preferably, the ceramic particles represent from about 55 percent to about 72 percent of the mixture by weight (exclusive of solvent), depending upon the application, to achieve the desired results.

The plasticizers are organic materials, but preferably are typically comprised of 2 parts by weight BUTVAR®B76 or B79, which is registered trademark of Solutia Inc. of St. Louis, Mo., to 1 part by weight dibutyl phthalate and are used to help maintain the composition in a putty-like consistency during application. A range of from about 1 percent to about 3 percent by weight of plasticizers is normally required in the composition (exclusive of solvent) to achieve the desired results.

The silica-yielding liquids are typically comprised of non-curing silicones, such as sold by General Electric under the names of TPR-179 and SR80M and are added to the composition to bond the ceramic particles of the fill-it 24 together during and after sintering. Similarly, the silica-yielding liquids also bond the skin member plies 12, 14 and the V-grooves 23 together during and after sintering. A range of from about 20 percent to about 26 percent by weight is normally required in the composition (exclusive of solvent) to achieve the desired results.

Evaporable solvents, preferably alcohol, and most preferably isopropanol and ethanol, are used to dissolve the BUTVAR®B76 or B79 plasticizer as well as wet the ceramic particles. However, other solvents such as acetone, may be used. A range of from about 2 percent to about 10 percent by weight is normally required in the composition to achieve the desired results. Since the solvent evaporates during the mixing/installation process, that is, is not present in the final, cured state after sintering, the weight percentage of the solvent is not included as part of the weight percentages of the ceramic particles, plasticizers or silica-yielding liquids. Stated another way, if the sum of the ceramic particles, plasticizers or silica-yielding polymers equals ten pounds, a 10 percent weight concentration of solvent simply means that 1 pound of solvent would then be added to the existing 10 pounds of the ceramic particles, plasticizers or silica-yielding liquids.

To create the composition, the ceramic particles were slowly added to a mixture of the plasticizers, silica-yielding liquids and solvents. Similar to preparing bread dough, this mixture was then kneaded until a putty-like consistency was achieved. The proportion of the ceramic particles added to the solution varied from "batch to batch," depending upon humidity, temperature or other environmental factors, as well as the desired application, so subjective aspects of each batch were necessarily evaluated. However, it was observed that once a sufficient quantity of ceramic particles had been added to achieve a sufficiently pliable mixture of substantially uniform consistency that was substantially, if not completely cohesive, and not adhesive, a workable putty mixture had been prepared. In other words, if the mixture was substantially of uniform consistency and substantially no longer adhered to the mixing instruments (or the hands (gloves) of the individual mixing the batch), a workable batch of the putty had been achieved. The term uniform consistency refers to the putty material that is a mixture having a substantially uniform distribution of suspended ceramic particles, which can be rolled into a thin, cylindrical shape without breaking. If the composition was kept sealed in a container from which the solvent cannot evaporate, the composition was saved, if desired, and reused. However, the putty hardened if the container was left open and the putty exposed to air for several hours by evaporation of the solvents.

Referring to FIGS. 4-6, the pliable, putty-like composition for providing the fill-it of the present invention may be formed into a substantially pliable cylindrical shape 28 resembling a noodle having a diameter of about one eighth of an inch. Since the composition is easy to work, a user may shape noodle 28 manually, or an automated shaping or extruding process may be used to produce the noodle. It may be desirable to fabricate wrapped prefabricated lengths of noodle 28 for use as needed, although the mixture of the composition, if properly contained, may be reused. Alternately, it may be desirable to form the composition into a shape that more closely resembles a triangle, such as by extruding, since this shape more closely resembles the final shape of the fill-it.

To install the composition in a stiffener, referring to FIG. 5, a user need merely direct a length of noodle 28 along a corresponding length of V-groove 23 of a partially assembled stiffener 10, which at the time of adding noodle 28, lacks skin member 22. After noodle 28 has been installed along V-groove 23 between adjacent flange portions 16, the user may employ a forming tool 30 having the required diameter or spatula to press a portion of the noodle 28 into the base of the V-groove 23, substantially fill the V-groove, and to form the remaining portion of the noodle material so that it is substantially flush with the surfaces of the flange portions 16. Preferably, forming tool 30 also is configured to remove excess noodle material, if any, from the stiffener. After noodle 28 has been installed and shaped, it is allowed to dry and cure. Upon the addition of skin member 22, the assembly of stiffener 10 is complete (FIG. 1), although subsequent manufacturing steps remain.

Once the skin member 22 is placed in contact with flange portions 16, and the noodle is allowed to dry, typically the stiffener 10 is vacuum bagged, that is, it is placed in a vacuum, such as by placing the stiffener 10 in a pliable container, such as plastic sheet, and removing the air contained within the pliable container. By removing the air, the stiffener components are brought into intimate contact, commonly referred to as debulking the plies. After the stiffener has been debulked, it is then placed in an autoclave which subjects the stiffener to nominally 200 psi pressure and about 300° F. which bonds and cures the ceramic plies as well as hardens the fill-it and bonds (by adhesion) it to the ceramic plies. After autoclaving, the stiffener is subjected to a nominal 1,800° F. for a 4 hour sintering operation, during which any organics typically are removed and the silica-yielding liquids decompose to silica which bonds the ceramic particles together as well as bonds (through ceramic interactions) the fill-it to the ceramic plies. Once sintering is complete, the resulting stiffener with a fill-it that has similar physical properties to the ceramic plies is ready for structural use.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition for use in a ceramic composite stiffener including a web portion, at least one flange portion, a radius region disposed between the web portion and the at least one flange portion, a skin member that is secured to the at least one flange portion and the radius region, the composition being applied along the radius region adjacent the skin member, the composition comprising:

about 55% to 72% by weight ceramic particles;
about 1% to 3% by weight plasticizers; and
about 20% to 26% by weight silica-yielding liquids; and sufficient solvent to permit mixing of the components and forming a pliable composition having a putty-like consistency capable of being rolled into a cylinder, wherein the cylinder conforms to and substantially fills a void between the radius region and the skin member; and wherein the ceramic particles range in size from about −20 mesh to about +50 mesh.

2. The composition of claim 1 wherein the ceramic particles are selected from the group consisting of alumina, crushed ceramic matrix composites, calcined clays, grog and combination thereof.

3. The composition of claim 1 wherein the plasticizers are organic compounds.

4. The composition of claim 1 wherein the silica-yielding liquids are non-curing silicones.

5. The composition of claim 1 wherein the weight percentage of an evaporable solvent is from about 2% to about 10% of the weight of the composition.

6. The composition of claim 1 wherein the pliable composition is substantially cohesive.

7. The composition of claim 1 wherein the pliable composition is of uniform consistency.

8. The composition of claim 1 wherein the evaporable solvent is an alcohol.

9. The composition of claim 8 wherein the evaporable solvent is isopropanol or ethanol.

10. The composition of claim 1 wherein the cylinder is formable in one contiguous segment.

11. The composition of claim 1 wherein the cylinder is about ⅛ inch in diameter.

12. The composition of claim 1 wherein the plasticizer comprises dibutyl phthalate.

* * * * *